(12) United States Patent
Paul et al.

(10) Patent No.: US 12,113,809 B2
(45) Date of Patent: *Oct. 8, 2024

(54) ARTIFICIAL INTELLIGENCE CORROBORATION OF VENDOR OUTPUTS

(71) Applicant: Bank of America Corporation, Charlotte, NC (US)

(72) Inventors: Ajay Jose Paul, Davidson, NC (US); Ghada I. Khashab, Allen, TX (US); Sidy Diop, Charlotte, NC (US); Peggy J. Qualls, Oswego, IL (US); Anthony R. Bandos, Clarkston, MI (US); Lori Mammoser, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 668 days.

This patent is subject to a terminal disclaimer.

(21) Appl. No.: 17/149,862

(22) Filed: Jan. 15, 2021

(65) Prior Publication Data
US 2022/0232018 A1    Jul. 21, 2022

(51) Int. Cl.
*H04L 9/00*    (2022.01)
*G06N 20/00*    (2019.01)
*H04L 9/40*    (2022.01)

(52) U.S. Cl.
CPC ......... *H04L 63/1416* (2013.01); *G06N 20/00* (2019.01); *H04L 63/1433* (2013.01); *H04L 63/1441* (2013.01)

(58) Field of Classification Search
CPC .. H04L 63/1416; H04L 63/1433; G06N 20/00
USPC .......................................................... 726/24
See application file for complete search history.

(56) References Cited

U.S. PATENT DOCUMENTS

| 7,698,275 | B2 | 4/2010 | O'Brien et al. |
| 7,716,742 | B1 | 5/2010 | Roesch et al. |
| 8,522,348 | B2 | 8/2013 | Chen et al. |
| 9,338,175 | B1 | 5/2016 | Ramos et al. |

(Continued)

FOREIGN PATENT DOCUMENTS

CN    104142679    3/2017

OTHER PUBLICATIONS

"CVE-Common Vulnerabilities and Exposures (CVE)," https://cve.mitre.org, Retrieved on Nov. 23, 2020.

(Continued)

*Primary Examiner* — Christopher J Brown
(74) *Attorney, Agent, or Firm* — Weiss & Arons LLP

(57) ABSTRACT

Artificial Intelligence ("AI") apparatus and method are provided that correlate and consolidate operation of discrete vendor tools for detecting cyberthreats on a network. An AI engine may filter false positives and eliminate duplicates within cyberthreats detected by multiple vendor tools. The AI engine provides machine learning solutions to complexities associated with translating vendor-specific cyberthreats to known cyberthreats. The AI engine may ingest data generated by the multiple vendor tools. The AI engine may classify hardware devices or software applications scanned by each vendor tool. The AI engine may decommission vendor tools that provide redundant cyberthreat detection. The AI engine may display operational results on a dashboard directing cyberthreat defense teams to corroborated cyberthreats and away from false positives.

20 Claims, 6 Drawing Sheets

(56) References Cited

U.S. PATENT DOCUMENTS

| | | | |
|---|---|---|---|
| 9,350,753 B2 | 5/2016 | Kaplan et al. | |
| 9,460,286 B1 | 10/2016 | Felstaine et al. | |
| 9,736,147 B1 | 8/2017 | Mead | |
| 9,948,663 B1 | 4/2018 | Wang et al. | |
| 10,091,229 B2 | 10/2018 | Stute et al. | |
| 10,102,056 B1* | 10/2018 | Goldberg | G06F 9/45558 |
| 10,257,227 B1 | 4/2019 | Stickle et al. | |
| 10,262,137 B1 | 4/2019 | Hart et al. | |
| 10,264,008 B2 | 4/2019 | Middleman et al. | |
| 10,339,484 B2 | 7/2019 | Pai et al. | |
| 10,341,377 B1 | 7/2019 | Dell' Amico et al. | |
| 10,367,844 B2 | 7/2019 | Stute et al. | |
| 10,503,908 B1 | 12/2019 | Bellis et al. | |
| 11,329,998 B1 | 5/2022 | Shahidzadeh et al. | |
| 2011/0173699 A1 | 7/2011 | Figlin et al. | |
| 2015/0047032 A1 | 2/2015 | Hannis et al. | |
| 2015/0163242 A1 | 6/2015 | Laidlaw et al. | |
| 2015/0172311 A1 | 6/2015 | Freedman et al. | |
| 2016/0006749 A1 | 1/2016 | Cohen et al. | |
| 2016/0344758 A1 | 11/2016 | Cohen et al. | |
| 2016/0366181 A1 | 12/2016 | Smith et al. | |
| 2017/0169229 A1 | 6/2017 | Brucker et al. | |
| 2017/0171231 A1 | 6/2017 | Reybok, Jr. et al. | |
| 2017/0243009 A1 | 8/2017 | Sejpal et al. | |
| 2017/0346851 A1 | 11/2017 | Drake | |
| 2018/0041533 A1* | 2/2018 | Chesla | G06F 16/24578 |
| 2018/0077188 A1 | 3/2018 | Mandyam et al. | |
| 2018/0077195 A1 | 3/2018 | Gathala et al. | |
| 2018/0322419 A1 | 11/2018 | Bugenhagen | |
| 2019/0020686 A1* | 1/2019 | Cohen | H04L 41/0893 |
| 2019/0058736 A1* | 2/2019 | Stupak | H04L 63/20 |
| 2019/0122150 A1 | 4/2019 | Treboniak et al. | |
| 2019/0124106 A1* | 4/2019 | Navarro | H04L 63/1425 |
| 2019/0166153 A1 | 5/2019 | Steele | |
| 2019/0171514 A1 | 6/2019 | Chowdhury | |
| 2019/0258807 A1 | 8/2019 | DiMaggio et al. | |
| 2019/0260786 A1 | 8/2019 | Dunn | |
| 2019/0260804 A1 | 8/2019 | Beck et al. | |
| 2019/0312890 A1* | 10/2019 | Perilli | H04L 63/145 |
| 2020/0021609 A1 | 1/2020 | Kuppanna et al. | |
| 2020/0089886 A1 | 3/2020 | Oetken | |
| 2020/0193315 A1 | 6/2020 | Sunkara et al. | |
| 2020/0209370 A1 | 7/2020 | Zhang et al. | |
| 2020/0213342 A1 | 7/2020 | Ahn et al. | |
| 2020/0236131 A1 | 7/2020 | Vejman et al. | |
| 2020/0244673 A1 | 7/2020 | Stockdale et al. | |
| 2020/0322371 A1 | 10/2020 | Chesla | |
| 2020/0404010 A1 | 12/2020 | Costante | |
| 2021/0067556 A1 | 3/2021 | Tahan | |
| 2021/0168161 A1 | 6/2021 | Dunn et al. | |
| 2021/0182551 A1 | 6/2021 | Kim et al. | |
| 2021/0224383 A1 | 7/2021 | Mizoguchi | |
| 2021/0273949 A1 | 9/2021 | Howlett et al. | |
| 2022/0027810 A1 | 1/2022 | Murthy et al. | |
| 2022/0035896 A1 | 2/2022 | Brannon et al. | |
| 2022/0159039 A1 | 5/2022 | Vinayagam et al. | |
| 2022/0166702 A1 | 5/2022 | An et al. | |
| 2022/0166801 A1 | 5/2022 | Murphy et al. | |
| 2022/0210141 A1* | 6/2022 | Parekh | H04L 63/08 |
| 2022/0224716 A1 | 7/2022 | Salji | |
| 2022/0224721 A1 | 7/2022 | Bertiger et al. | |

OTHER PUBLICATIONS

"CVE-2020-9992," https://cye.mitre.org/cgi?name=CVE-2020-9992, Retrieved on Nov. 23, 2020.

"CVE Search Results," https://cve.mitre.org/cgi-bin/evekey.cgi?keyword=network, Retrieved on Nov. 23, 2020.

"Gateway (telecommunications)," https://en.m.wikipedia.org/wiki/Gateway (telecommunications), Wikimedia Foundation, Inc., Dec. 11, 2020.

"Gateway Definition," https://techterms.com/definition/gateway, Sharpened Productions, Feb. 12, 2015.

* cited by examiner

ARTIFICIAL INTELLIGENCE CORROBORATION OF VENDOR OUTPUTS

FIELD OF TECHNOLOGY

This application relates to a machine learning system for consolidating cybersecurity vulnerabilities detected by disparate software tools deployed across an enterprise organization.

BACKGROUND

An enterprise organization may deploy a large variety of computing devices deployed across multiple networks. Deployed devices may include different hardware architectures. Deployed devices may include different software configurations. Deployed devices may include servers, desktops and mobile devices.

Because of the wide variety of computing devices deployed on the network, the enterprise organization may utilize multiple vendor tools to detect and remediate cyberthreats that may penetrate a device or network. Illustrative cyberthreats may include activity that allows or effectuates unauthorized access to systems or information available on a network. Exemplary cyberthreats include phishing and spear phishing, malicious code and access to removable media. Each vendor tool may be configured to detect target cyberthreats associated with the configuration or function of a specific device.

For example, some vendor tools may be configured to detect cyberthreats that target operation of software. Some vendor tools may be configured to detect cyberthreats that target operation of hardware. Some vendor tools may be configured to detect cyberthreats that target middleware. Vendor tools may be configured to detect cyberthreats in different network layers or any suitable cyberthreat.

Each vendor tool may generate cyberthreat detection alerts in different formats. The different formats may be proprietary. It may therefore be difficult to determine when a cyberthreat alert generated by different vendor tools include false positives or duplicates. For example, multiple vendor tools may operate on a single device. The multiple vendor tools may provide overlapping cyberthreat detection coverage for different components of the single device. Because of the volume and complex interconnections among computing devices and vendor tools deployed across an enterprise organization and the proprietary formats of cyberthreat alerts generated by each vendor tool, it is not technically feasible to manually filter outputs of the many vendor tools.

Accordingly, it would be desirable to provide artificial intelligence apparatus and methods for using artificial intelligence and machine learning to filter vendor-specific cyberthreat alerts. Such filtering may include identifying false positives, corroborating cyberthreat alerts and correlating proprietary cyberthreat alerts to descriptions of known cyberthreats. Accordingly, it would be desirable to provide ARTIFICIAL INTELLIGENCE CORROBORATION OF VENDOR OUTPUTS.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
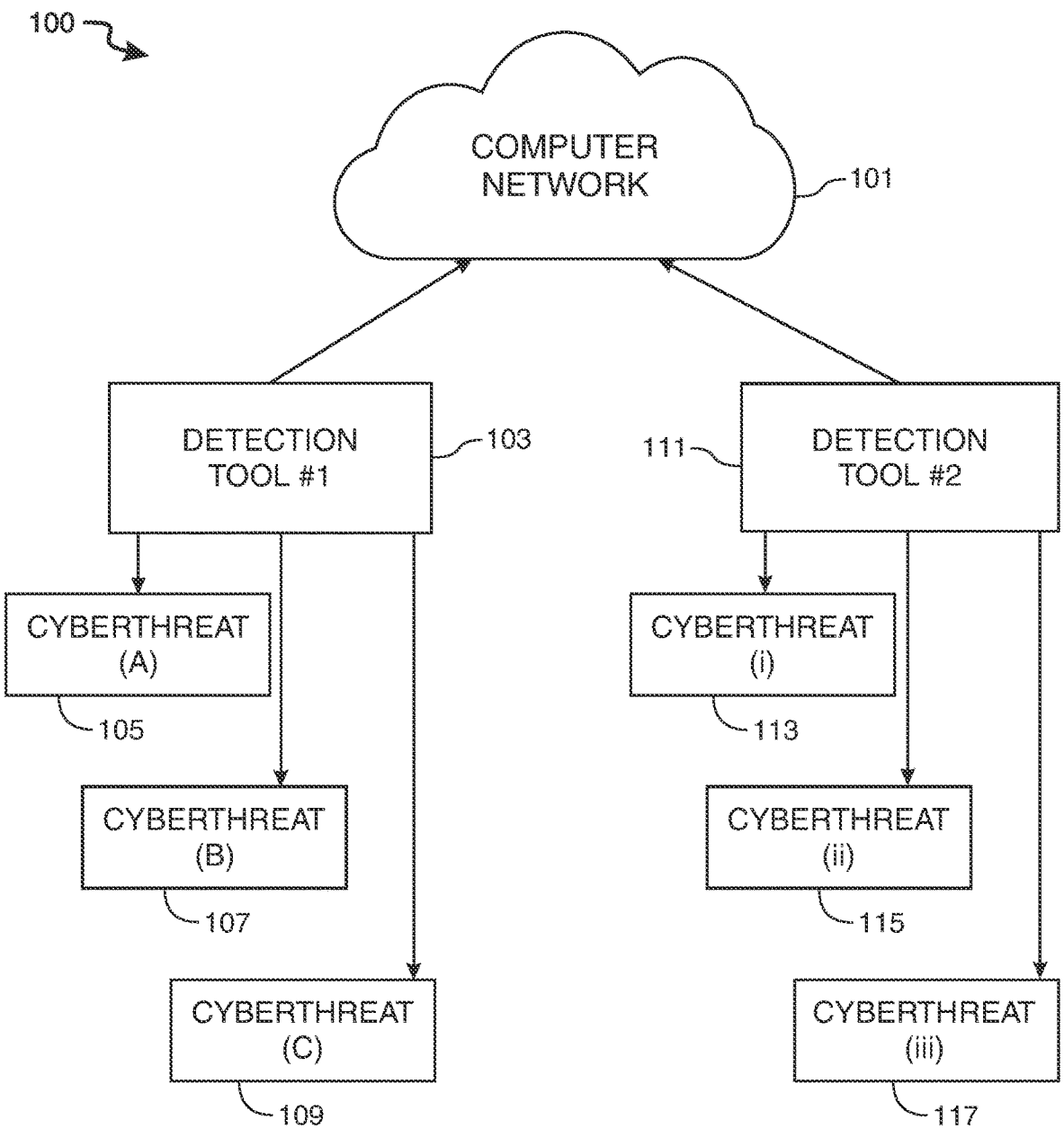
FIG. 1 shows an illustrative system in accordance with principles of the disclosure.

An artificial intelligence ("AI") method is provided for filtering cyberthreats detected by disparate software tools deployed across an enterprise organization. The filtering may include unifying or determining that different vendor tools have each detected the same cyberthreat. The AI method may include receiving output from a first vendor tool deployed to detect cyberthreats. The output of the first vendor tool may include a first cyberthreat detected by the first vendor tool. The output of the first vendor tool may include a first set of countermeasures that are configured to neutralize the first cyberthreat.

Methods may include receiving output from a second vendor tool. The output of the second vendor tool may include a second cyberthreat detected by the second vendor tool. The output of the second vendor tool may include a second set of countermeasures that are configured to neutralize the second cyberthreat.

Countermeasures may include any suitable change to system operation or function that is designed to protect against successful effectuation of a cyberthreat. Illustrative countermeasures may include:

Mobilizing a human cyberthreat defense team;
Isolating (e.g., physically or logically disconnecting) a system from the network;
Encrypting data;
Prompting system users to change their passwords or otherwise update their access credentials;
Turning off automatic downloading of email messages;
Blocking malicious links/IP addresses;
Block all unnecessary communication ports;
Disabling unused protocols and services; and/or
Obtaining and installing current operating system service packs and software patches.

Methods may include applying machine learning techniques to the output of the first vendor tool and to the output of the second vendor tool. Illustrative machine learning algorithms may include one or of the following machine learning algorithms: Naïve Bayes Classifier Algorithm, K Means Clustering Algorithm, Support Vector Machine Algorithm, Apriori Algorithm, Linear Regression, Logistic Regression, Artificial Neural Networks, Nearest Neighbors, Random Forests and/or Decision Trees. Any suitable machine learning algorithm may be utilized.

The machine learning techniques may determine a set of overlapping actions for neutralizing a detected cyberthreat. The overlapping action may be countermeasures that have been generated by the first and second vendor tools. Based on the set of overlapping action, the machine learning techniques may attempt to determine whether the first and second cyberthreats correspond to a single cyberthreat.

Based on the set of overlapping action, the machine learning techniques may attempt to determine whether the first and second cyberthreats correspond to a known cyberthreat. A known cyberthreat may be defined and described in Common Vulnerabilities and Exposures ("CVE®") published by The MITRE Corporation of Annapolis Junction, Maryland CVE® includes records that each include an identification number, a description, and at least one public reference associate with publicly known cyberthreats.

Each member in a set of overlapping actions may correspond to a countermeasure that is included in the first set of countermeasures and included in the second set of countermeasures. The AI method may determine that the first and second vendor tools have detected the same cyberthreat because alerts generated by both vendor tools are associated with a threshold number of overlapping countermeasures. The threshold number of overlapping countermeasures may correspond to the number of members in the set of overlapping actions.

Methods may include associating the set of overlapping actions with a single cyberthreat. The single cyberthreat may be a recognized cyberthreat known to the enterprise organization. The single cyberthreat may be a known CVE record. The AI method may identify the single cyberthreat based on correlating countermeasures included in the set of countermeasures to countermeasure that are known to mitigate the single cyberthreat.

The set of overlapping actions may include a combination of countermeasures that is different from countermeasures included in the first set of countermeasures. The set of overlapping actions may include a combination of countermeasures that is different from countermeasures included in the second set of countermeasures.

Methods may include determining a third set of countermeasures based on a known cyberthreat. Methods may include deploying the third set of countermeasure to neutralize the detected cyberthreat. The third set of countermeasures may be different from the first set of countermeasures. The third set of countermeasures may be different from the second set of countermeasures. For example, the enterprise organization may have determined that the third set of countermeasure are effective for neutralizing the detected cyberthreat when on the enterprise organization's devices or networks.

The output of the first vendor tool may be generated in a first proprietary format. The first proprietary format may be incompatible with the second vendor tool. Thus, the second vendor tool may not understand output generated by the first vendor tool. The output of the second vendor tool may be generated in a second proprietary format. The second proprietary format may be incompatible with the first vendor tool. Thus, the first vendor tool may not understand output generated by the second vendor tool.

The AI method may include applying machine learning techniques to the output of the first vendor tool and the detected cyberthreat. The machine learning algorithm may determine that the first cyberthreat maps onto a standard cyberthreat classification or description. For example, the AI method may determine that the first vendor tool, in response to detecting the first cyberthreat, generates countermeasures that neutralize the detected cyberthreat.

The AI method may include applying machine learning techniques to the output of the second vendor tool and the output of the second vendor tool. The machine learning algorithm may determine that the first cyberthreat and the second cyberthreat are discrete and unrelated cyberthreats. For example, the set of overlapping action may include less than a threshold number of members.

The AI method may include overriding the first set of countermeasures generated by the first vendor tool. Instead of countermeasures generated by the first vendor tool, the AI method may apply a third set of countermeasures to neutralize the first cyberthreat. The third set of countermeasures may be associated with a known cyberthreat. The third set of countermeasure may be known to be effective against the known cyberthreat, which the AI method has determined corresponds to the first cyberthreat detected by the first vendor tool. The third set of countermeasures may include members of the first set of countermeasures and members of the second set of countermeasures.

The AI method may include applying machine learning techniques and classifying the first cyberthreat as corresponding to the second cyberthreat. In some embodiments, the first and second vendor tools may operate on the same device. For example, the first vendor tool may be installed on a network accessible sever. The first vendor tool may also scan workstations that connect to the server. The second vendor tool may be installed directly on a workstation that connects to the server. The AI method may identify duplicate cyberthreats identified by the first and second vendor tools.

In other embodiments, the first and second vendor tools may operate on unrelated systems. However, the correlating of the first and second cyberthreats to a known cyberthreat may indicate that multiple vendor tools have detected a cyberthreat. The AI methods may include prioritizing remediation of cyberthreats that are independently detected by two or more vendor tools.

An artificial intelligence ("AI") filter is provided. The AI filter may include a first application program interface ("API"). The first API provides access to output generated by a first vendor tool. The AI filter may include a second API. The second API provides access to output generated by a second vendor tool. The AI filter may include a database. The database may store cyberthreats detected and neutralized by a human cyberthreat defense team.

The AI filter may include an AI engine. The AI engine may filter outputs generated by the first vendor tool. The AI engine may filter outputs generated by the second vendor tool. Based on filtering both outputs, the AI engine may generate a single cyberthreat. The filtering may include translating vendor-specific descriptions of cyberthreats into the descriptions stored in the database.

The database may store vulnerability mapping of cyberthreats to targeted computing devices on utilized by the enterprise organization. The AI filter may leverage the vulnerability mappings to filter the vendor specific cyberthreat descriptions. The database may store records of cyberthreats detected and neutralized by a human cyberthreat defense team. The AI filter may leverage these records to filter the vendor specific cyberthreat descriptions.

The database may store inter-dependencies linking two or more cyberthreats. The AI filter may leverage the inter-dependencies to filter the vendor specific cyberthreat descriptions. The database may store standardized descriptions of cyberthreats. For example, the database may include MITRE CVE® descriptions. The AI filter may leverage the standardized descriptions to filter the vendor specific cyberthreat descriptions.

For example, the AI engine may attempt to translate the first output and the second output into standardized MITRE CVE® cyberthreat descriptions. The AI engine may perform the translation by examining countermeasures included in the first and second outputs. The AI engine may filter the first and second output by detecting patterns linking the first and second outputs to information stored in the database. Such patterns may include hardware or software that may be vulnerable to the detected cyberthreat. Such patterns may include countermeasures for neutralizing a cyberthreat. Such patterns may include results of previous filtering results generated by the AI engine in connection with outputs of the first and second vendor tools.

The AI engine may utilize pattern recognition algorithms such as parametric classification algorithms, non-parametric classification algorithms, clustering algorithms, regression algorithms, real-valued sequence labeling algorithms, multilinear subspace learning algorithms and ensemble learning algorithms (for combining use of two or more learning algorithms).

Detected patterns may include terminology included in the first and second output and standardized descriptions of cyberthreats. Detected patterns may include terminology included in the first and second output and descriptions of one or more cyberthreats detected and neutralized by a human cyberthreat defense team.

In response to filtering the outputs of the first and second vendor tools, the AI engine may generate a single cyberthreat. For example, the AI engine may determine that the first and second outputs correspond to the single cyberthreat. The AI engine may determine that one of the first and second outputs is a false-positive.

The AI engine may identify an output generated by the first vendor tool as a false positive. The AI engine may identify an output generated by the second vendor tool as a false positive. The AI engine may determine that, for a first software application, the output generated by the first vendor tool is a false positive. The AI engine may determine that for a second software application, the output generated by the first vendor tool detects an actionable cyberthreat.

The AI filter may identify the output of the first vendor tool and the output of the second vendor tool as being duplicates. The AI engine may prioritize remediation of duplicative cyberthreats. In response to identifying the duplicates, the AI engine may generate a standardized expression for the single cyberthreat. The standardized expression may correspond to a MITRE CVE® description.

The AI engine may determine a set of countermeasures for neutralizing the single cyberthreat. A set of countermeasures for neutralizing the single cyberthreat may be a null set. A null set may not have any members. Based on the presence of the null set, the AI engine may classify the outputs of the first and second vendor tools as false positives. For example, the AI engine may be unable to correlate the output of the first and second vendor tools to any records in the database. The null set may indicate that there is no corresponding known cyberthreat associated with the countermeasures generated by the first and second vendor tools.

An artificial intelligence ("AI") system for identifying false positive and duplicate cyberthreats is provided. The system may identify false positive and duplicate cyberthreats in outputs detected by multiple vendor tools deployed across an enterprise organization. The system may include an AI engine.

The AI engine may filter outputs generated by each of the multiple vendor tools. The AI engine may generate a primary set of commonalities shared by each of the outputs. The primary set of commonalities may be components of a computer system that are exposed or vulnerable to a detected cyberthreat. The primary set of commonalities may include attributes that are shared by the first and second detected cyberthreats.

The attributes of a cyberthreat may include a severity rating, information on how to fix the cyberthreat, software vulnerable to the cyberthreat, hardware vulnerable to the cyberthreat, countermeasures for neutralizing the cyberthreat, how often the cyberthreat is detected in an enterprise organization or worldwide, and correlations to other cyberthreats. Correlations to other cyberthreats may include other cyberthreats that are found on a compromised system when a target cyberthreat is also detected on the compromised system.

Based on the primary set of commonalities, the AI engine may link the outputs generated by the multiple vendor tools to a single cyberthreat. The single cyberthreat may be a known cyberthreat included in the MITRE CVE® listing. The AI engine may formulate a set of countermeasures for neutralizing the single cyberthreat. For example, the single cyberthreat may be identified when a known cyberthreat shares a threshold number of commonalities with the primary set of commonalities shared by the outputs of the vendor tools.

The AI system may include a dashboard for graphically displaying a first subset of the commonalities. The first subset may be associated with output of a first vendor tool. The dashboard may display a second subset of the commonalities. The second subset may be associated with output of a second vendor tool. The dashboard may display a third subset of the commonalities. The third subset may define the single cyberthreat.

The dashboard may present links showing how and why the commonalities associated with the single cyberthreat proposed by the AI engine map onto each commonality included in the primary set of commonalities. The dashboard may present links showing how and why countermeasures proposed by the AI engine map onto each commonality included in the primary set of commonalities.

The dashboard may assign a visual marker to a subset of commonalities when the subset includes a threshold number of commonalities that overlap with another subset of commonalities. For example, the dashboard may assign a visual marker to the first subset of commonalities when the first subset includes a threshold number of commonalities that overlap with the second subset of the commonalities. The visual marker may show why the AI engine has linked the first and second subsets to a single cyberthreat.

The multiple vendor tools may operate on different computing devices. The multiple vendor tools may operate on a single hardware architecture. The multiple vendor tools may operate on a single software system. The primary set of commonalities may identify components of the single hardware architecture or the single software system that are exposed to the single cyberthreat.

An artificial intelligence ("AI") method for unifying cybersecurity vulnerabilities detected by disparate vendor software tools deployed across an enterprise organization. The AI method may include detecting a first vendor tool operating on a target hardware system. In response to detecting the first vendor tool, the AI method may include connecting an AI engine to a first application program interface ("API").

Via the first API, the AI engine may formulate requests for output generated by the first vendor tool. In response to the formulated requests, the first API may provide the AI engine a first cyberthreat formulated by the first vendor tool.

The AI method may include detecting a second vendor tool operating on the target hardware system. In response to detecting the second vendor tool, the AI method may include connecting the AI engine to a second API. Via the second API, the AI engine may formulate requests for output generated by the second vendor tool. In response to the formulated requests, the second API may provide the AI engine a second cyberthreat formulated by the second vendor tool.

The AI method may include applying machine learning techniques to the first cyberthreat and to the second cyberthreat. The machine learning techniques may determine that the first cyberthreat and the second cyberthreat correspond to a common cyberthreat. The common cyberthreat may be a cyberthreat included in a MITRE CVE® listing. The AI engine may prioritize allocation of computing resources to neutralize the detected common cyberthreat.

The AI method may include determining that the first cyberthreat and the second cyberthreat correspond to the known cyberthreat by detecting a common IP address in the first cyberthreat and in the second cyberthreat. The AI method may include determining that the first cyberthreat and the second cyberthreat correspond to the known cyberthreat by detecting a common host name in the first cyberthreat and in the second cyberthreat.

The AI method may include capturing a first set of first cyberthreats generated by the first vendor system over a predetermined time period. The AI method may include capturing a second set of second cyberthreats generated by the second vendor system over the predetermined time period. Using the AI engine, methods may include determining that the first set includes a threshold number of known cyberthreats associated with a target hardware system. Using the AI engine, methods may include determining that the second set also includes the threshold number of known cyberthreats associated with the target hardware system.

In response to detecting the threshold number of known cyberthreats associated with the target hardware system, AI methods may include registering the first and second vendor tools as generating duplicative outputs for the target hardware system. The AI method may include decommissioning the first vendor tool or the second vendor tool from operating on the target hardware system.

The AI method may include using the AI engine to determine a first relative complement of the first set and the threshold number of known cyberthreats. The first relative complement may identify cyberthreats detected by the first vendor tool and not classified as a known cyberthreat. A known cyberthreat may be a cyberthreat listed in the MITRE CVE®. A known cyberthreat may be a cyberthreat previously detected on a system within an enterprise organization. A known cyberthreat may be a cyberthreat previously neutralized by a human cyberthreat defense team at the enterprise organization.

The AI method may include determining a second relative complement of the second set and the threshold number of known cyberthreats. The second relative complement may identify cyberthreats that have been detected by the second vendor tool and are not classified as known cyberthreats.

When the first relative complement includes more members than the second relative complement, the AI method may include decommissioning the second vendor tool. In such scenarios, the first vendor tool may be providing more comprehensive cyberthreat detection than the second vendor tool. When the second relative complement includes more members than the first relative complement, the AI method may include decommissioning the first vendor tool. In such scenarios, the second vendor tool may be providing more comprehensive cyberthreat detection than the first vendor tool.

Methods may include maintaining operation of both the first and second vendor tools on the target system when both vendor tools are detecting a threshold number of unique cyberthreats. Methods may determine that the first and second tools are capturing the threshold number of unique cyberthreats when a union set of the first relative complement (unique cyberthreats captured by the first tool) and the second relative complement (unique cyberthreats captured by the first tool) includes a threshold number of members.

An artificial intelligence ("AI") system that detects duplicate cyberthreats is provided. The system may include an AI engine. The AI engine may be configured to siphon first cyberthreats detected by a first vendor tool. The AI engine may siphon the first cyberthreats generated by the first vendor tool using a first API to communicate with the first vendor tool. The AI engine may siphon second cyberthreats detected generated by a second vendor tool. The AI engine may siphon the second cyberthreats generated by the second vendor tool using a second API to communicate with the second vendor tool.

The AI engine may extract a common IP address from the first and second cyberthreats siphoned from the first and second vendor tools. Based on the extracted common IP address, the AI engine may determine that the first and second vendor tools are operating on a target device.

The system may include a translation engine. The translation engine may ingest the first cyberthreats and the second cyberthreats siphoned by the AI engine. The translation engine may determine whether the first and second cyberthreats correspond to one or more known cyberthreats associated with the target device.

The system may include a decommissioning tool. The decommissioning tool may remove at least one of the first or the second vendor tool from the target device. The decommissioning tool may "uninstall" a vendor tools from the target device. The decommissioning tool may delete files associated with a vendor tool from the target device. The decommissioning tool may cancel a subscription associated with the removed vendor tool.

The AI engine may active the decommissioning tool when, over a predetermined time period, the first cyberthreats detected by the first vendor tool include a threshold number of known cyberthreats and the second cyberthreats detected by the second vendor tool also includes the threshold number the same known cyberthreats. Because both vendor tools are generating the threshold number of the same known cyberthreats, the AI engine may determine that having both vendor tools is an unnecessary redundancy.

The AI engine may be further configured to determine a first intersection of the first cyberthreats detected by the first vendor tool and the threshold number of known cyberthreats. The first intersection may indicate how many known cyberthreats have been detected by the first vendor tool. The AI engine may be configured to determine a second intersection of the second cyberthreats detected by the second vendor tool and the threshold number of known cyberthreats. The second intersection may indicate how many known cyberthreats have been detected by the second vendor tool.

The AI engine may pass the first vendor tool to the decommissioning tool when the first intersection includes fewer members than the second intersection. When the first intersection has fewer members, the first vendor tool may be less effective at detecting known cyberthreats.

The AI engine may determine a first relative complement of the first cyberthreats and the threshold number of known cyberthreats. The first relative complement may indicate how many known cyberthreats have not been detected by the first vendor tool. The AI engine may determine a second relative complement of the second cyberthreats and the threshold number of instances of the known cyberthreat. The second relative complement may indicate how many known cyberthreats have not been detected by the second vendor tool.

The AI engine pass the first vendor tool to the decommissioning tool when the first relative complement includes fewer members than the second relative complement. When the first relative complement includes fewer members than the second relative complement, the first vendor tool may be detecting fewer known cyberthreats than the second vendor tool.

The AI engine may be further configured to simulate an impact of removing a vendor tool from the target device. The AI engine may run such a simulation before passing a vendor tool to the decommissioning tool. The simulation may determine which, if any, cyberthreats would have been detected by the vendor tool scheduled to be removed from the target device. The simulation may determine which, if any, cyberthreats would not been detected by the vendor tool scheduled to remain on the target device.

Based on the simulation, the AI engine may confirm whether to remove a vendor tool. The simulation may determine whether removal of a vendor tool will expose the target device to an undetected cyberthreat.

An artificial intelligence ("AI") system that detects duplicate cyberthreats is provided. The AI system may include computer executable instructions. The computer executable instructions, when executed by a processor on a computer system may perform one or more AI steps for detecting duplicate cyberthreats detected by different vendor tools.

The AI system may include instructions that siphon first output generated by a first vendor tool. The first output may include cyberthreats detected by the first vendor tool. Based on a host name identified in the first output, the AI system may associate the first output with a target device. The AI system may determine whether detected cyberthreats in the first output correspond to a known cyberthreat associated with the target device.

In response to determining that the first output does correspond to a known cyberthreat, the AI system may determine whether second output generated by a second vendor tool also corresponds to the known cyberthreat. The second output may include cyberthreats detected by the second vendor tool. In response to determining that the second output also corresponds to the known cyberthreat, the AI system may flag the first and second vendor tools as generating duplicate outputs. The AI system may determine that both the first and second vendor tools are detecting the same known cyberthreat(s).

The AI system may trigger deployment of countermeasures to neutralize detected duplicate cyberthreats. The AI system may prioritize deployment of computer resources to neutralize the detected duplicate cyberthreats over neutralization of non-duplicate cyberthreats detected by the first or second vendor tools. The presence of duplicates may corroborate or confirm detection of a known cyberthreat by two vendor tools.

The AI system may include instructions that apply machine learning techniques to correlate a number of detected duplicate cyberthreats to a number of unique cyberthreats detected by each of the first and second vendor tools. When there are less detected duplicate cyberthreats than detected unique cyberthreats, the AI system may flag the duplicate cyberthreats as potential false positives. For any flagged cyberthreats, the AI system may require confirmation by a human operator before deploying countermeasures to neutralize the duplicate cyberthreats.

The AI system may determine that cyberthreats detected by the first and second vendor tools include a threshold number of duplicate cyberthreats. In response to detecting the threshold number of duplicate cyberthreats, the AI system may trigger a decommissioning tool. The decommissioning tool may determine whether to decommission one of the first and second vendor tools.

The decommissioning tool may determine whether the first and second vendor tools are operating on a second target device in addition to operating on a first target device. The decommissioning tool may determine whether the first and second vendor tools are generating a threshold number of duplicate cyberthreats when operating on the second target device.

When the AI system determines that the first and second vendor tools generate the threshold number of duplicate cyberthreats when operating on the second device, the AI system may trigger a decommissioning of the first or second vendor tool. The threshold number of duplicate cyberthreats may indicate there is overlap in the detection capabilities of the first and second vendor tools. For example, the first vendor tool may operate on applications, middleware and operating system. The second vendor tool may operate on applications and middleware.

Based on output received from the decommissioning tool, the AI system may decommission the second vendor tool. The detection capabilities provided by the first vendor tool may encompass the applications and middleware serviced by the second vendor tool.

The decommissioning tool may attempt to corroborate that the first cyberthreat (detected by the first vendor tool) and the second cyberthreat (detected by the second vendor tool) include an identical IP address. The identical IP address may confirm that the first and second vendor tool are operating on the same target device. When both vendor tools are operating on the same target device, the cyberthreats detected by the vendor tools may include the identical IP address.

In some embodiments, the first vendor tool may operate on a middleware application and the second vendor tool may operate on a desktop application of the target device. Therefore, the AI system may apply machine learning to determine whether the first and second cyberthreats are duplicate cyberthreats or different cyberthreats.

An artificial intelligence ("AI") method is provided for unifying cyberthreats detected by disparate vendor tools deployed across an enterprise organization. The AI method may include inventorying a first set of technical attributes associated with a first device. The first device may be a computing device on a network within the enterprise organization. The first set of technical attributes may define the first device.

Exemplary technical attributes may include one or more of the following: (1) exposure of computational assets running on the device to a public network; (2) a manufacturer of the device; (3) a domain name associated with the device; (4) hardware components installed on the device; (5) software components installed on the device; (6) a physical location of the device; (7) connectivity channels of the device; (8) a technical team assigned to maintain the device; and (9) a serial number of the device.

Based on the first set of technical attributes, the AI method may include generating a set of model technical attributes. The model technical attributes may define a representative device that may be vulnerable to the same cyberthreats as the first device. The first device may be local to a network. A local network device may be a device that is connected to a network using a local area network ("LAN") connection.

The AI method may include searching for a second device that includes a second set of technical attributes. The second device may be remote to the network. A remote network device may be a device that is connected to a network using a wide area network ("WAN") connection.

The AI method may determine whether the second set of technical attributes (associated with the second device) map onto the set of model technical attributes. The AI method may include determining whether the second set of technical attributes match or can be correlated to a threshold number of the model technical attributes.

Based on the first set of technical attributes, the AI method may include generating model hardware. The model hardware may exemplify hardware present on the first device. Based on the first set of technical attributes, the AI method may include generating model software. The model software may exemplify software present on the first device. The AI method may include generating the set of model technical attributes based on the model hardware and the model software.

The AI method may include determining the set of model technical attributes based on fuzzifying the first or second set of technical attributes. Fuzzifying a set of technical attributes may include assigning detected technical attributes a degree of membership in the set of model technical attributes. A degree of membership may be anywhere within the interval [0,1].

For example, if the value assigned to a technical attribute is 0, that attribute will be excluded from the set of model technical attributes. If the value assigned to an attribute is 1, that attribute will be included in the set of model technical attributes. If the value assigned to an attribute is between 0 and 1, then the attribute will be present in the set of model technical attributes to a degree. The degree, or amount of presence of the attribute in the set of model technical attributes will correspond to the value between 0 and 1 assigned to the attribute. A machine learning algorithm may assign a value to an attribute.

Fuzzifying of a first set of technical attributes may allow members of the first set to map onto members of a second set (e.g., model technical attributes) without an identical member-to-member match. For example, the fuzzification may allow members of the set of model technical attributes to map onto members of a second set of technical attributes based on a functionality performed by each member of the model or second set.

The AI method may include detecting a first cyberthreat detection vendor tool operating on a first device. The AI method may include detecting a second cyberthreat detection vendor tool operating on a second device. The AI method may include diverting computing resources to identify duplicate cyberthreats detected by the first and second vendor tools. The AI method may divert computing resources to neutralizing duplicate cyberthreats when the first and second devices each include technical attributes that map onto the model technical attributes.

The successful mapping to the model technical attributes may increase the likelihood that the first and second devices are vulnerable to the same cyberthreats. The AI method may therefore throttle distribution of computing resources to neutralize cyberthreats. The AI method may deploy more computing resources to detect and neutralize cyberthreats that impact a larger number of devices on a network.

The AI method may include capturing a first cyberthreat detected by the first vendor tool. The AI method may include capturing a second cyberthreat detected by the second vendor tool. The AI method may include mapping the first cyberthreat to a description of a known cyberthreat. The known cyberthreat may be defined by a MITRE CVE® entry.

The AI method may include, when the second cyberthreat maps to a description of a known cyberthreat, in real-time, deploying countermeasures to neutralize (1) the first cyberthreat detected on the first device and (2) the second cyberthreat detected on the second device.

The AI method may include searching for a third device that includes a third set of technical attributes that map onto the set of model technical attributes. Methods may include searching for the known cyberthreat on the third device.

An artificial intelligence ("AI") system for unifying cyber threats detected by software tools deployed across an enterprise organization is provided. The AI system may include computer executable instructions, executable by a processor on a computer system.

The AI system may detect a first cyberthreat. The first cyberthreat may be generated by a first vendor tool operating on a first device. The AI system may generate a first set of technical attributes that define the first device.

Based on the first set of technical attributes, the AI system may generate a set of model technical attributes. The set of model technical attributes may include a subset of hardware attributes and a subset of software attributes. The AI system may determine the set of model technical attributes based on fuzzifying the first set of technical attributes. The first device may be a local server accessible on a network via a local area network connection.

The AI system may search for a second device. The second device may be defined by a second set of technical attributes. The second device may be a remote server accessible on the network via a wide area network connection. The second set of technical attributes may map onto the set of model technical attributes. The AI system may determine whether the second set of technical attributes map onto the set of model technical attributes based on fuzzifying the second set of technical attributes.

The AI system may search for a second vendor tool operating on the second device. Because the second device includes technical attributes that map onto the model attributes, the second device may be vulnerable to the same cyberthreats as the first device. A second vendor tool operating on the second device may be redundant to the first vendor tool. For example, the second vendor tool may be decommissioned, and the first vendor tool applied to both the first and second devices.

When the second vendor tool generates a second cyberthreat, the AI system may divert computing resources to determine whether the first and the second cyberthreats are duplicates. The AI system may determine whether the first and the second cyberthreat alerts are duplicates by (1) mapping the first cyberthreat alert to a description of a known cyberthreat and (2) mapping the known cyberthreat onto the second cyberthreat alert.

When the first and the second cyberthreat alerts map onto the description of the known cyberthreat, the AI system may deploy, in real-time, countermeasures to neutralize the first cyberthreat detected on the first device. When the first and the second cyberthreat alerts map onto the description of the known cyberthreat, the AI system may deploy, in real-time, countermeasures to neutralize the second cyberthreat detected on the second device.

The AI system may search for a third device that includes a third set of technical attributes that map onto the set of model technical attributes. The AI system may search for a third vendor tool operating on the third device. When the third vendor tool generates a third cyberthreat alert, the AI system may divert computing resources to determine whether the second and third cyberthreat alerts are duplicates. The successful mapping of the third set of technical attributes to the set of model technical attributes may increase the likelihood the third device may be vulnerable to the same cyberthreats as the first and/or second devices.

An artificial intelligence ("AI") system for unifying cyberthreats detected by vendor detection tools deployed across an enterprise organization is provided. The AI system may include computer executable instructions that are executable by a processor on a computer system.

For a first device on a network, the AI system may generate a first set of technical attributes that define a position of the first device on the network. For a second network device, the AI system may generate a second set of technical attributes that define a position of the second network device on the network. The network position may be physical location. A network position may be defined relative to other devices on the network.

For example, the network position may be a geographic location of the first device. The network position may be an IP address of the first device. The network position may be logical position of the first device. A logical position may be defined based on the network connections that link the first device to other devices on the network. For example, the logical position may be defined based on whether the first device communicates with other devices using a wired connection or a wireless connection.

The logical connection may be defined based on the level of security that is employed when the first device communicates with another device on the network. The logical position may be define based on whether the first device communicates with other devices using a LAN or a WAN. A network position may be defined relative to devices outside the network.

The AI system may from an intersection of members of the first set of technical attributes that are also members of the second set of technical attributes. When the intersection includes a threshold number of members, the AI system may divert computing resources to determine whether a first vendor tool operating on the first network device and a second vendor tool operating on the second network device are detecting duplicate cyberthreats. The presence of the threshold number of members in the intersection may indicate that the first and second devices share a threshold number of technical attributes and may therefore be vulnerable to similar cyberthreats.

Exemplary technical attributes may include one or more of (1) exposure of computational assets running on a device to a public network; (2) a domain name associated with the device; (3) a subnet mask applied to the device; (4) hardware components installed on the device; (5) software components installed on the device; (6) upstream connections of the device; (7) downstream connections of the device; and (8) a physical location of the device.

The AI system may form a set of model technical attributes. The set of model technical attributes may include members of the intersection of the first and second sets of technical attributes. For a third network device, the AI system may generate a third set of technical attributes. The third set of technical attributes may define a position of the third network device on the network.

When an intersection of the third set of technical attributes and the set of model technical attributes includes a threshold number of members, the AI system may divert computing resources to determine whether a third vendor tool operating on the third network device and the second vendor tool operating on the second network device generate duplicate cyberthreats. The presence of the threshold number of members in the intersection may indicate that the second and third devices share a threshold number of technical attributes and may therefore be vulnerable to similar cyberthreats.

An artificial intelligence ("AI") method for unifying cybersecurity vulnerabilities detected by disparate vendor tools deployed across an enterprise organization is provided. The AI method may include receiving output from a first vendor tool. The first vendor tool may be deployed to monitor hardware performance on a target computer system. The output received from the first vendor tool may include a first cyberthreat detected by the first vendor tool.

The AI method may include applying machine learning techniques to corroborate the first cyberthreat detected by the first vendor tool. When the machine learning techniques fail to corroborate the first cyberthreat, the AI method may flag the first cyberthreat as a false positive.

Corroborating the first cyberthreat may include comparing attributes of the detected first cyberthreat to attributes of other detected cyberthreats. The other cyberthreats may be detected by the first vendor tool. The other cyberthreats may be detected by other vendor tools. The other cyberthreats may include publicly known cybersecurity vulnerabilities, such as those listed in one or more MITRE CVE® entries. Corroborating the first cyberthreat may include comparing attributes of the detected cyberthreats to attributes of known cyberthreats.

Illustrative attributes of a cyberthreat may include hardware and/or software systems that may be vulnerable to a detected cyberthreat. Illustrative attributes of a cyberthreat may include other systems or components produced by a manufacturer of hardware and/or software systems that are known to be vulnerable to the detected cyberthreat. Illustrative attributes of a cyberthreat may include devices that communicate with the target computer device where a cyberthreat was detected. Illustrative attributes of a cyberthreat may include countermeasures available for neutralizing a detected cyberthreat.

The AI method may include receiving output from a second vendor tool. The second vendor tool may also be deployed to monitor software performance on the target computer system. The output received from the second vendor tool may include a second cyberthreat detected by the second vendor tool.

The AI method may include applying machine learning techniques to corroborate the second cyberthreat to a known cyberthreat. The known cyberthreat may be associated with the enterprise organization. For example, the known cyberthreat may be have been detected a neutralized by a cyberthreat defense team of the enterprise organization. The known cyberthreat may correspond to an entry in a known cyberthreat classification listing. The MITRE CVE® is an illustrative known cyberthreat classification listing.

When the first and second cyberthreats both corroborate with the known cyberthreat, the AI method may include formulating a set of countermeasures designed to neutralize the known cyberthreat. The AI method may include deploying the set of countermeasures against the first cyberthreat detected by the first vendor tool. The AI method may include deploying the set of countermeasures against the second cyberthreat detected by the second vendor tool.

Detection of the first cyberthreat may be formulated by the first vendor tool in a first proprietary format. The first proprietary format may be incompatible with the second vendor tool. Detection of the second cyberthreat may be formulated in a second proprietary format. The second proprietary format may be incompatible with the first vendor tool. By linking the first and second cyberthreats to a known cyberthreat, the AI method may bridge incompatibility of the first and second vendor tools without complex computations needed to translate the first and second cyberthreats and then compare the translations to each other. This may provide more efficient use of computational resources.

The AI method may include applying a first machine learning technique to corroborate the first cyberthreat to the known cyberthreat. The AI method may include applying a second machine learning techniques to corroborate the second cyberthreat to the known cyberthreat.

When the first and second cyberthreats both corroborate to the known cyberthreat, the AI method may include classifying the first cyberthreat as corresponding to the second cyberthreat. In response to detecting such corroboration, the AI method may override a first set of countermeasures generated by the first vendor tool. The overriding may include applying, to the first cyberthreat, a set of countermeasures designed to neutralize the known cyberthreat. The set of countermeasures designed to neutralize the known cyberthreat may include countermeasures formulated by the first vendor tool. The set of countermeasures designed to neutralize the known cyberthreat may include countermeasures formulated by the second vendor tool. The AI method may determine which countermeasures have the greatest efficacy against a known cyberthreat.

An artificial intelligence ("AI") filter is provided. The AI filter may include a first application program interface ("API"). The AI filter may be executed by a gateway on the first network. A gateway may be a hardware device that acts as bridge between two networks. A gateway may be a router, firewall, server, or other network connected device that regulates a flow of data in and out of the network.

The gateway may be configured to interact with a first vendor tool using the first API. The first vendor tool may operate on a first system. The first system may be on the first network. Using the API to communicate with the first vendor tool, the AI filter may utilize the gateway to ingest output generated by the first vendor tool.

The AI filter may include a second API. The gateway may be configured to interact with a second vendor tool using the second API. The AI filter may utilize the gateway to ingest output generated by the second vendor tool. The second vendor tool may operate on a second system. The second system may be on a second network. The gateway bridge between the first and second networks.

The AI filter may include an AI engine. The AI engine may be run on the gateway. The AI engine may determine when the first output and the second output correspond to a known cyberthreat. The AI engine may identify output generated by the first vendor tool and output generated by the second vendor tool as being duplicate cyberthreats. In response to detecting the duplicates, the AI engine may prioritize deployment of computing resources to neutralize the detected duplicate cyberthreats. Corroboration of a cyberthreat by two or more vendor tools may reduce the risk that the computing resources are being used to neutralize a false positive.

The first vendor tool may be deployed to monitor hardware performance of a computer system. The second vendor tool may also be deployed to monitor hardware performance of the computer system. In some embodiments, the first and second vendor tools may both operate on the same computer system. In such embodiments, when the AI engine fails to determine that the first output and the second output correspond to the same cyberthreat, the AI filter may flag the first output and the second output as false positives.

The AI engine may determine that output generated by the first vendor tool is a false positive. The AI engine may determine that output generated by the second vendor tool detects an actionable cyberthreat. For example, the output of the first vendor tool may not correspond to a known cyberthreat. The output of the second vendor tool may correspond to a known cyberthreat.

In some embodiments, the first vendor tool may operate on a first computer system and the second vendor tool may operate on a second computer system.

An artificial intelligence ("AI") system for corroborating cyberthreats detected by multiple vendor tools is provided. The AI system may include computer code executable by a processor on a computer system.

The AI system may extract attributes from a first cyberthreat detected by a first vendor tool. The AI system may extract attributes from a second cyberthreat detected by a second vendor tool. The AI system may delay deployment of countermeasures against the first and second cyberthreats. The delay may include waiting a pre-determined amount of time after a vendor tool detects a cyberthreat and before deploying countermeasures against the detected cyberthreat. The delay may provide time for an AI engine to determine whether the cyberthreats detected by the first and second vendor tools are duplicates, false positives or correspond to a known cyberthreat.

The AI system may formulate an intersection of attributes extracted from the first detected cyberthreat and attributes extracted from the second detected cyberthreat. The AI system may delay deployment of countermeasures based on the number of attributes included in the intersection. For example, if the number of attributes in the intersection exceeds a threshold number, the first and second vendor tools may have both detected duplicate cyberthreats.

When the intersection of the attributes extracted from the first detected cyberthreat and the attributes extracted from the second detected cyberthreat exceeds the threshold number of attributes, AI system may prioritize the allocation of computing resources to deployment of countermeasures until the first and second detected cyberthreats are neutralized. Because the first and second detected cyberthreats have been corroborated by the AI system, the first and second detected cyberthreats may be neutralized as soon as possible.

The AI system may form a union set of attributes extracted from the first detected cyberthreat and the second detected cyberthreat. The AI system may extract attributes from a third cyberthreat detected by a third vendor tool. The AI system may delay deployment of countermeasures against the third detected cyberthreat until an intersection of the attributes extracted from the third detected cyberthreat and the union set (overlapping attributes extracted from the first and second detected cyberthreats) exceeds a threshold number of attributes.

When an intersection of attributes extracted from the first detected cyberthreat and attributes extracted from the second detected cyberthreat exceed the threshold number of attributes, the AI system may assign a visual marker to attributes included in the intersection. The visual marker may indicate that the first and second cyberthreats have been corroborated by the AI system. The visual marker may be displayed on dashboard presented to members of a human cyberthreat defense team.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with any other illustrative apparatus and/or method embodiment.

FIG. 1 shows illustrative system 100. System 100 includes network 101. Network 101 may include multiple interconnected devices. The interconnected devices may include servers, workstations and mobile devices.

System 100 includes vendor tool 103. Vendor tool 103 may be deployed within network 101. Vendor tool 103 may be configured to detect cyberthreats that may compromise one or more devices on network 101.

A vendor tool, a decommissioning tool, or an AI engine may include software executed by a computing system. The computing system may include a processor circuit. The processor circuit may control overall operation of a component. A processor circuit may include hardware, such as one or more integrated circuits that form a chipset. The hardware may include digital or analog logic circuitry configured to perform any suitable (e.g., logical) operation.

The computing system include one or more of the following hardware components: I/O circuitry, which may include a transmitter device and a receiver device and may interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory.

The computing system may include RAM, ROM, an input/output ('I/O") module and a non-transitory or non-volatile memory. Machine-readable memory may be configured to store information in machine-readable data structures. The I/O module may include a microphone, button and/or touch screen which may accept user-provided input. The I/O module may include one or more of a speaker for providing audio output and a video display for providing textual, audiovisual and/or graphical output.

Software applications executed by the computing system may be stored within the non-transitory memory and/or other storage medium. Software applications may provide instructions to the processor that enable the computing system to perform various functions. For example, the non-transitory memory may store software applications used by the AI engine, such as an operating system, application programs, machine learning algorithms, cyberthreat detection algorithms and an associated database. Alternatively, some or all of computer executable instructions of the AI engine may be embodied in hardware or firmware components of the computing system.

Software applications may include computer executable instructions for invoking user functionality related to communication, such as email, short message service ("SMS"), and voice input and speech recognition applications. Software application programs may utilize one or more algorithms that process received executable instructions, perform power management routines or other suitable tasks.

Software applications may utilize computer-executable instructions, such as program modules, executed by a processor. Generally, program modules include routines, programs, objects, components, data structures, etc. that perform particular tasks or implement particular abstract data types. A computing system may be operational with distributed computing environments where tasks are performed by remote processing devices that are linked through a communications network. In a distributed computing environment, program modules may be located in both local and remote computer storage media including memory storage devices. Computing systems may rely on a network of remote servers hosted on the Internet to store, manage, and process data (e.g., "cloud computing" and/or "fog computing").

A computing system may be part of two or more networks. A computing system may support establishing network connections to one or more remote computing systems. Illustrative network connections may include a local area network ("LAN") and a wide area network ("WAN"). When used in a LAN networking environment, a computing system may be connected to the LAN through a network interface or adapter. A computing system may include a communication circuit. The communication circuit may include a network interface card or adapter.

When used in a WAN networking environment, a computing system may include a modem, antenna or other circuitry for establishing communications over a WAN, such as the Internet. The communication circuit may include a modem and/or antenna.

The existence of any of various well-known protocols such as TCP/IP, Ethernet, FTP, HTTP and the like is presumed, and a computing system may be operated in a client-server configuration to permit a user to retrieve web pages from a web-based server. Web browsers can be used to display and manipulate data on web pages.

Computing systems may include components, such as a display, battery, speaker, and antennas. Components of the computing system may be linked by a system bus, wirelessly or by other suitable interconnections. Components of the computing system may be present on one or more circuit boards. In some embodiments, the components may be integrated into a single chip. The chip may be silicon-based.

FIG. 1 shows that vendor tool 103 has detected cyberthreats 105, 107 and 109. Vendor tool 103 may output cyberthreats 105, 107 and 109 using a proprietary format that is not easily convertible or relatable to cyberthreats 113, 115 and 117 detected by vendor tool 111.

Vendor tool 111 has also been deployed within network 101. Vendor tool 111 may be configured to detect cyberthreats that may compromise one or more devices on network 101. FIG. 1 shows that vendor tool 111 has detected cyberthreats 113, 115 and 117. Vendor tool 111 may express cyberthreats 113, 115 and 117 using a proprietary format that is not easily convertible to cyberthreats 105, 107 and 109 detected by vendor tool 103.

Thus, vendor tools 103 and 111 may be detecting duplicate cyberthreats. This disclosure provides apparatus and methods for utilizing artificial intelligence to determine whether vendor tools 103 and 111 are detecting duplicate cyberthreats.

Figure 2:
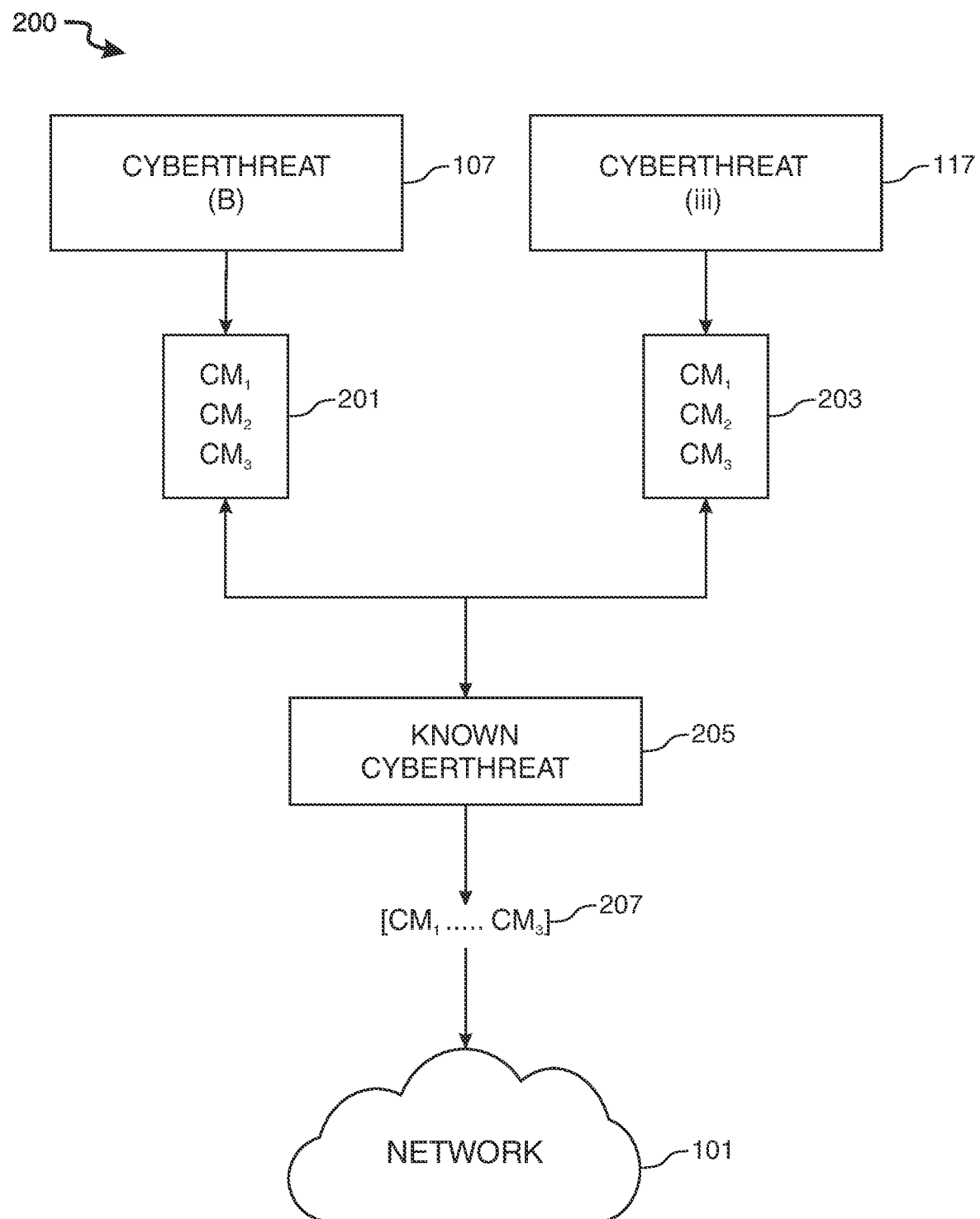
FIG. 2 shows an illustrative system and process in accordance with principles of the disclosure.

FIG. 2 shows illustrative AI process 200 for identifying duplicate cyberthreats. Process 200 shows that vendor tool 103 has generated countermeasures 201 for neutralizing cyberthreat 107. Process 200 shows that vendor tool 111 has generated countermeasures 203 for neutralizing cyberthreat 117.

An AI engine may determine whether the countermeasures 201 correspond to known cyberthreat 205. The AI engine may determine whether the countermeasures 203 correspond to known cyberthreat 205. For example, the AI engine may determine whether countermeasures 207 for neutralizing known cyberthreat 205 include a threshold number of countermeasures 201. The AI engine may determine whether countermeasures 207 for neutralizing known cyberthreat 205 include a threshold number of countermeasures 203.

When countermeasures 207 include a threshold number of countermeasures 201 and 203, the AI engine may classify cyberthreats 107 and 117 as duplicates. The AI engine may deploy countermeasures 207 within network 101 against cyberthreats 107 and 117.

Figure 3:
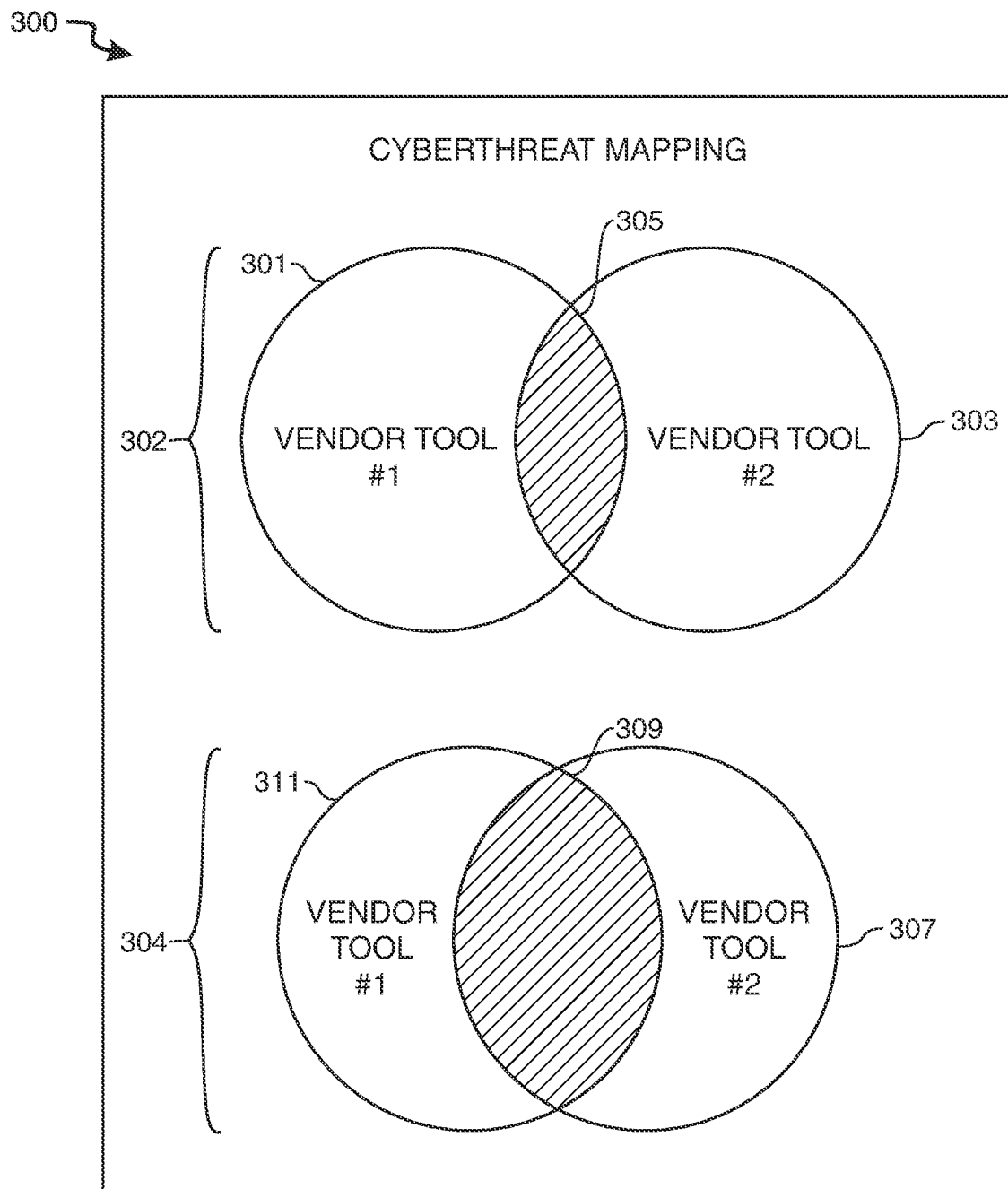
FIG. 3 shows illustrative output generated by systems in accordance with principles of the disclosure.

FIG. 3 shows illustrative dashboard 300. Dashboard 300 shows a visual depiction of cyberthreats detected by vendor tool 103 and vendor tool 111 on network 302. Dashboard 300 shows a visual depiction of cyberthreats detected by vendor tool 103 and vendor tool 111 on network 304.

Dashboard 300 shows that an AI engine has extracted attributes for each cyberthreat detected by vendor tool 103. The AI engine has visually generated universe 301 representing the extracted attributes associated with cyberthreats detected by vendor tool 103.

Dashboard 300 shows that an AI engine has extracted attributes for each cyberthreat detected by vendor tool 111. The AI engine has visually generated universe 303 representing the extracted attributes associated with cyberthreats detected by vendor tool 111.

The AI engine has also identified intersection 305. Intersection 305 includes extracted attributes that are shared by cyberthreats detected by vendor tools 103 and 111. The attributes within intersection 305 may represent duplicate cyberthreats.

Dashboard 300 shows that AI engine has determined that when operating on network 302, vendor tools 103 and 111 detect more discrete cyberthreats relative to detected duplicate cyberthreats. AI engine may therefore maintain operation of both vendor tools 103 and 111 on network 302.

Dashboard 300 shows that when operating on network 304, vendor tools 311 and 307 detect more duplicate cyberthreats 309 relative to discrete cyberthreats. AI engine may therefore decommission one of vendor tools 103 and 111 on network 304. Decommissioning one of vendor tools 103 and 111 may improve a performance of network 304. For example, decommissioning one of the vendor tools may reduce data traffic on network 304. decommissioning one of the vendor tools may improve the performance of computing devices operating on network 304. After the decommissioning, only one of the vendor tools may be operating on network computing devices, reducing a computational load carried by the network computing devices.

Figure 4:
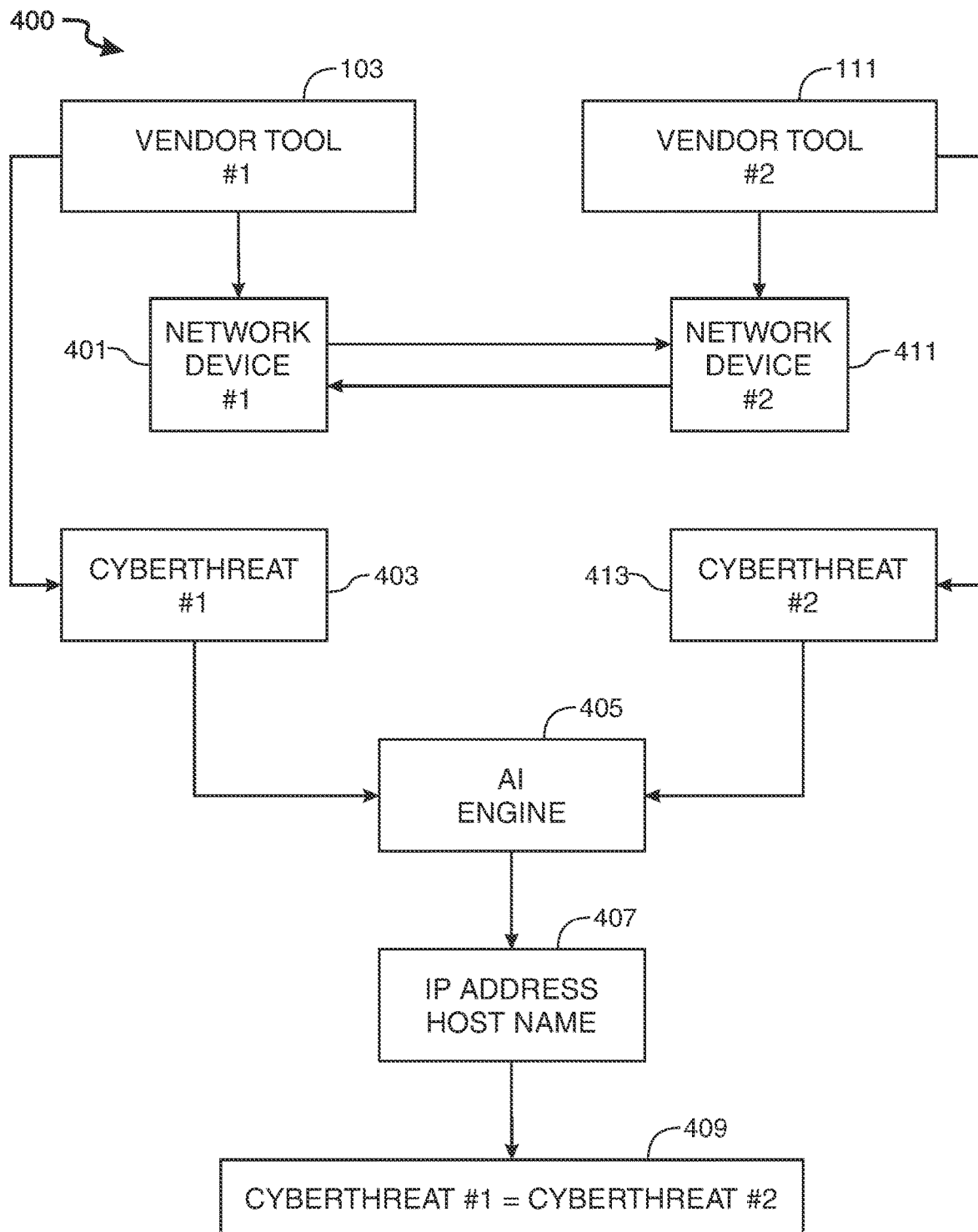
FIG. 4 shows an illustrative system and process in accordance with principles of the disclosure.

FIG. 4 shows illustrative AI process 400. Process 400 shows vendor tool 103 operating on computing device 401. Process 400 shows that computing device 401 is in communication with computing device 411 over a network. For example, computing device 401 may be a server and network device 411 may be a workstation that accesses files stored on the server.

Process 400 shows that vendor tool 111 is operating on computing device 411. However, vendor tool 103 may be configured to detect cyberthreats on any device that is in communication with computing device 401. Vendor tool 103 may be detecting cyberthreats on both computing device 401 and computing device 411. However, because vendor tools 103 and 111 do not generate outputs in a mutually understandable format, it may be difficult to ascertain whether vendor tools 103 are detecting duplicate cyberthreats.

Process 400 shows that AI engine 405 examines cyberthreat 403 detected by vendor tool 103 and cyberthreat 413 detected by vendor tool 111. Process 400 shows that AI engine 405 may examine cyberthreats 403 and 415 for attributes that may indicate they are duplicates. Process 400 shows that AI engine 405 detects that cyberthreats 403 and 413 include identical host names and IP address. Based on this determination, at step 409, AI engine 405 classifies cyberthreats 403 and 413 as duplicates.

Figure 5:
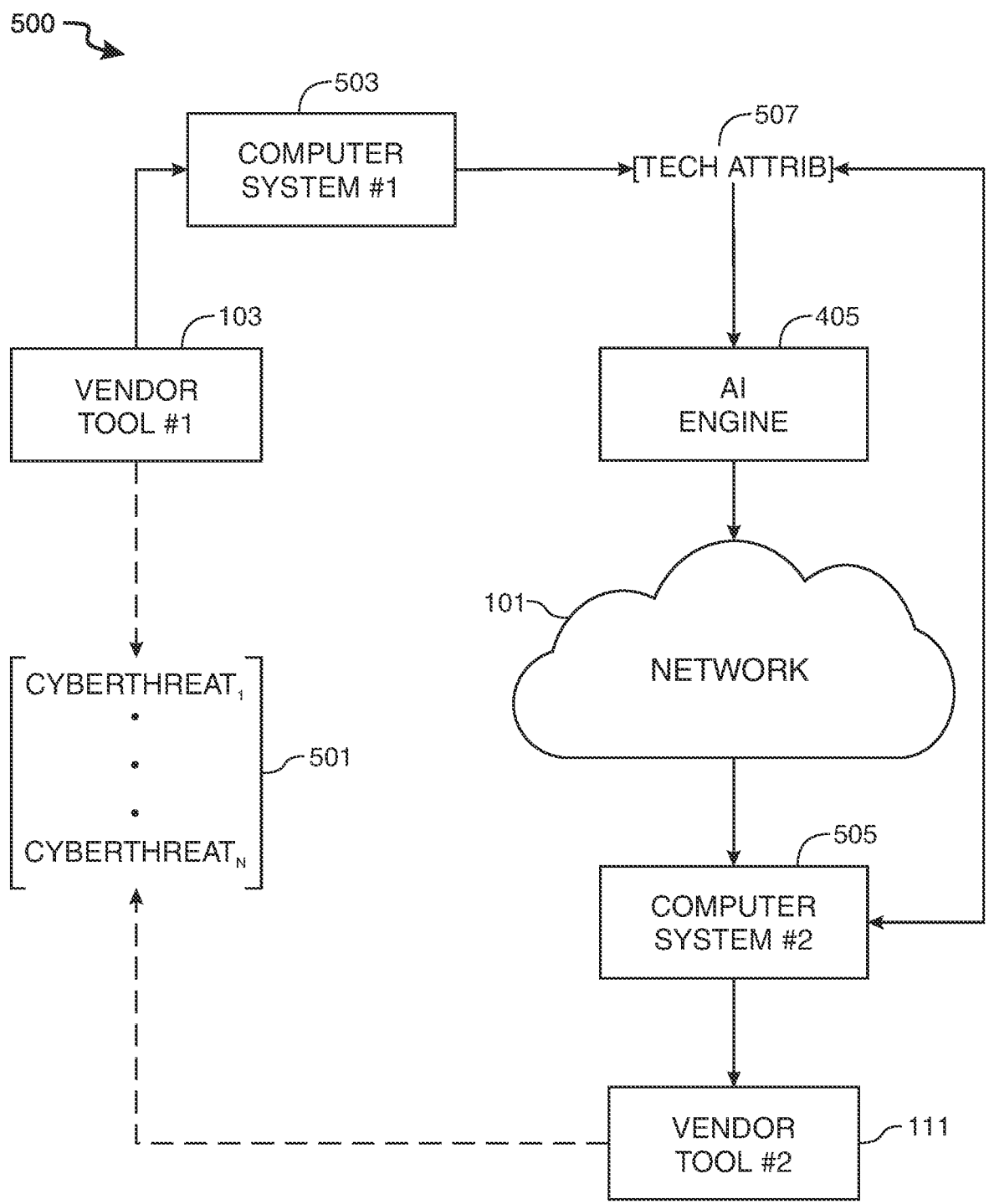
FIG. 5 shows an illustrative system and process in accordance with principles of the disclosure.

FIG. 5 shows illustrative AI process 500 for consolidating the number of vendor tools operating on a network for detecting cyberthreats. Process 500 shows that AI engine 405 extracts attributes 507 from computing device 503. AI engine 405 also extracts attributes 507 from computing device 505.

Based on extracted attributes 507, AI engine 405 may determine whether vendor tool 103 needs to operate on computing device 503. Based on extracted attributes 507, AI engine 405 may determine whether vendor tool 111 needs to operate on computing device 505.

For example, when computing devices 503 and 505 share a threshold number of attributes 507, AI engine may determine that vendor tool 111 may operate and detect cyberthreats 501 on both computing devices 503 and 505. AI engine 405 may therefore decommission vendor tool 103 from operating on computing device 503.

Figure 6:
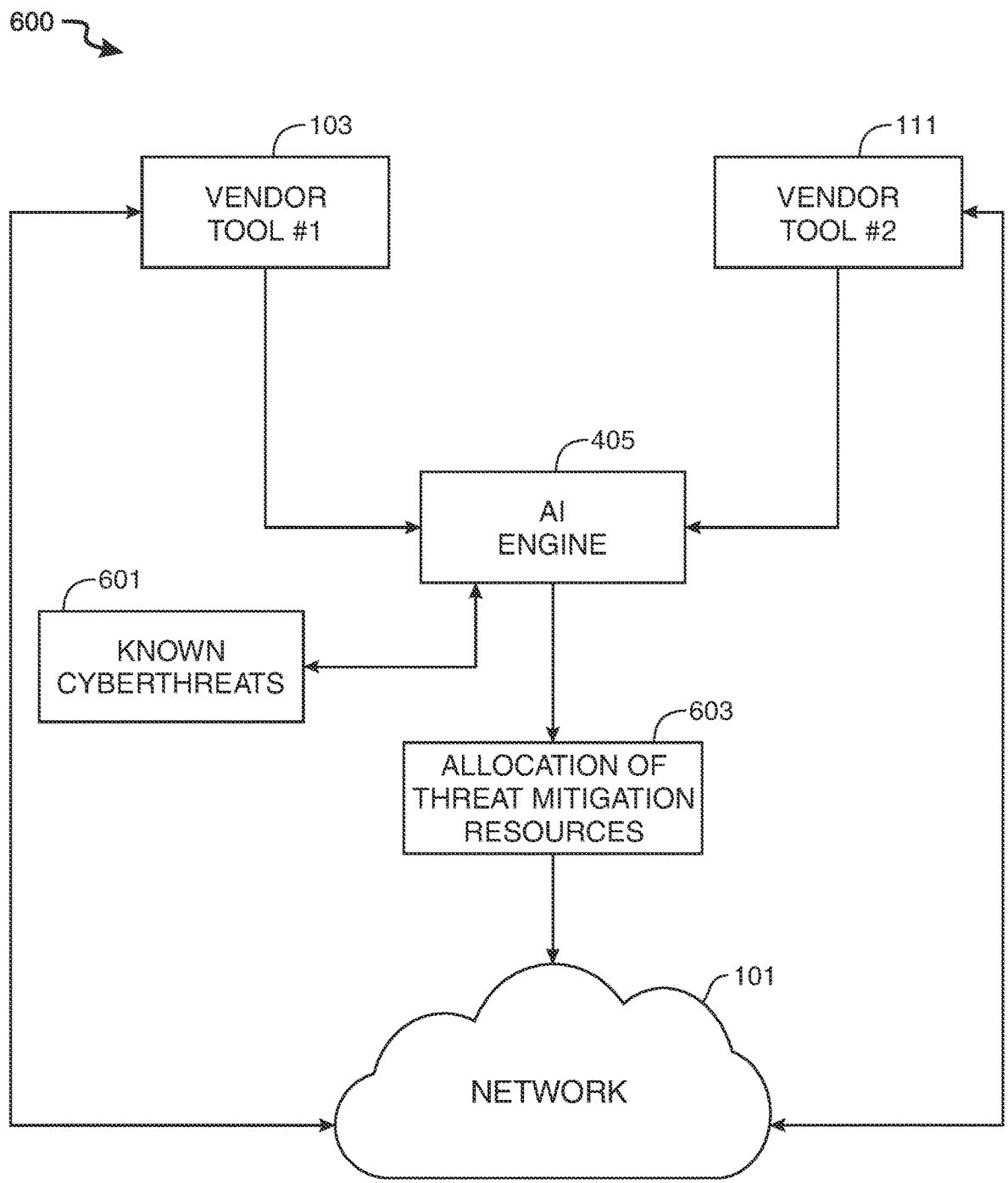
FIG. 6 shows an illustrative system and process in accordance with principles of the disclosure.

FIG. 6 shows AI process 600. Process 600 shows that AI engine 405 has determined that vendor tools 103 and 111 have detected one or more of known cyberthreats 601. AI engine 405 may prioritize allocation of threat mitigation resources 603 to neutralize known cyberthreats detected on network 101. The corroboration of cyberthreats detected by vendor tools 103 and 111 to known cyberthreats 601 may reinforce reliability of cyberthreats detected by vendor tools 103 and 111.

Thus, methods and apparatus for ARTIFICIAL INTELLIGENCE CORROBORATION OF VENDOR OUTPUTS are provided. Persons skilled in the art will appreciate that the present disclosure can be practiced by other than the described embodiments, which are presented for purposes of illustration rather than of limitation, and that the present disclosure is limited only by the claims that follow.

What is claimed is:

1. An artificial intelligence ("AI") method for unifying cybersecurity vulnerabilities detected by disparate software tools deployed across an enterprise organization, the AI method comprising:
- receiving, at an AI engine, output from a first vendor tool comprising:
  - a first cyberthreat detected by the first vendor tool; and
  - a first set of countermeasures that neutralize the first cyberthreat;
- applying, using the AI engine, machine learning techniques to corroborate the first cyberthreat to a known cyberthreat;
- receiving, at the AI engine, output from a second vendor tool comprising:
  - a second cyberthreat detected by the second vendor tool; and
  - a second set of countermeasures that neutralize the second cyberthreat;
- applying, using the AI engine, machine learning techniques to corroborate the second cyberthreat to the known cyberthreat;
- when the first and second cyberthreats both corroborate to the known cyberthreat, formulating, by the AI engine, a set of overlapping countermeasures designed to neutralize the known cyberthreat, wherein each member of the set of overlapping countermeasures is included in the first set of countermeasures and included in the second set of countermeasures;
- formulating, by the AI engine, a third set of countermeasures including the set of overlapping countermeasures and a combination of countermeasures that is different from countermeasures included in the first and second sets of countermeasures based on the known cyberthreat;
- overriding, by the AI engine, the first and second sets of countermeasures output by the first and second vendor tools respectively;
- deploying, by the AI engine, the third set of countermeasures against the first cyberthreat detected by the first vendor tool and the second cyberthreat detected by the second vendor tool;
- decommissioning, by the AI engine without user intervention, the first vendor tool when a first intersection of a set of first cyberthreats detected by the first vendor tool includes fewer members than a second intersection of a set of second cyberthreats by the second vendor tool; and
- decommissioning, by the AI engine without user intervention, the second vendor tool when the second intersection includes fewer members than the first intersection.

2. The AI method of claim 1, wherein:
- the first cyberthreat is formulated by the first vendor tool in a first proprietary format;
- the second cyberthreat is formulated by the second vendor tool in a second proprietary format;
- the first proprietary format is incompatible with the second vendor tool; and
- the second proprietary format is incompatible with the first vendor tool.

3. The AI method of claim 1, wherein applying machine learning techniques to corroborate the first cyberthreat to the known cyberthreat comprises mapping the first cyberthreat onto a cyberthreat classification standard.

4. The AI method of claim 3, further comprising:
- applying, by the AI engine, a first machine learning technique to corroborate the first cyberthreat to the known cyberthreat; and
- applying, by the AI engine, a second machine learning techniques to corroborate the second cyberthreat to the known cyberthreat.

5. The AI method of claim 4, when the first machine learning technique fails to corroborate the first cyberthreat to the known cyberthreat, flagging the first cyberthreat as a false positive.

6. The AI method of claim 1, further comprising, when the first and second cyberthreats both corroborate to the known cyberthreat, classifying the first cyberthreat as corresponding to the second cyberthreat.

7. The AI method of claim 1, wherein:
- the first vendor tool is deployed to monitor hardware performance on a computer system; and
- the second vendor tool is deployed to monitor software performance on the computer system.

8. The AI method of claim 1 wherein the third set of countermeasures are effective for neutralizing the detected cyberthreat when on the enterprise organization.

9. The AI method of claim 1 further comprising prioritizing remediation of cyberthreats that are independently detected by two or more vendor tools.

10. An artificial intelligence ("AI") system comprising:
- a processor;
- a memory;
- a first application program interface ("API") that ingests first output generated by a first vendor tool, the first output comprising:
  - a first cyberthreat detected by the first vendor tool; and
  - a first set of countermeasures that neutralize the first cyberthreat;
- a second API that ingests second output generated by a second vendor tool, the second output comprising:
  - a second cyberthreat detected by the second vendor tool; and
  - a second set of countermeasures that neutralize the second cyberthreat; and
- an AI engine that:
  - determines when the first output and the second output correspond to a known cyberthreat;
  - formulates a set of overlapping countermeasures designed to neutralize the known cyberthreat, wherein each member of the set of overlapping countermeasures is included in the first set of countermeasures and included in the second set of countermeasures;
  - formulates a third set of countermeasures including the set of overlapping countermeasures and a combination of countermeasures that is different from countermeasures included in the first and second sets of countermeasures based on the known cyberthreat;
  - overrides the first and second sets of countermeasures output by the first and second vendor tools respectively;
  - prioritizes deployment of computing resources to deploy the third set of countermeasures to neutralize the known cyberthreat;
  - decommissions, without user intervention, the first vendor tool when a first relative complement of a set of first cyberthreats not detected by the first vendor tool includes more members than a second relative complement of a set of second cyberthreats not detected by the second vendor tool; and decommissions, without user intervention, the second vendor tool when the second relative complement includes more members than the first relative complement.

11. The AI system of claim 10, wherein:
the first vendor tool is deployed to monitor hardware performance on a computer system;
the second vendor tool is deployed to monitor hardware performance on the computer system; and
when the AI engine fails to determine that the first output and the second output correspond to the known cyberthreat, flagging the first output and the second output as false positives.

12. The AI system of claim 10, wherein the AI engine identifies the first cyberthreat of the first output generated by the first vendor tool and the second cyberthreat of the second output generated by the second vendor tool as being duplicates.

13. The AI system of claim 10, wherein:
the first vendor tool operates on a first system on a first network; and
the second vendor tool operates on a second system on a second network.

14. The AI system of claim 10, wherein the AI engine determines that:
the first cyberthreat of the first output generated by the first vendor tool is a false positive; and
the second cyberthreat of the second output generated by the second vendor tool is an actionable cyberthreat.

15. An artificial intelligence ("AI") system for corroborating cyberthreats detected by multiple vendor tools, the system comprising:
a processor;
a memory; and
a non-transitory computer readable medium including computer code that when executed by the processor:
extracts attributes from a first cyberthreat detected by a first vendor tool;
extracts attributes from a second cyberthreat detected by a second vendor tool;
formulates a set of overlapping attributes, wherein each member of the set of overlapping attributes is included in the attributes extracted from the first and second vendor tools;
formulates a set of countermeasures including the set of overlapping attributes and countermeasures that are different from the attributes extracted from the first and second vendor tools based on the first and second cyberthreats;
delays deployment of the set of countermeasures against the first and second cyberthreats until an intersection of the attributes extracted from the first cyberthreat and the attributes extracted from the second cyberthreat exceeds a threshold number of members; and
decommissions the first vendor tool when:
a set of first cyberthreats detected by the first vendor tool includes a threshold number of known cyberthreats; and
a set of second cyberthreats detected by the second vendor tool includes the threshold number of known cyberthreats and an additional predetermined number of distinct known cyberthreats.

16. The AI system of claim 15 wherein the first vendor tool and the second vendor tool operate on a target computer system.

17. The AI system of claim 15 wherein:
the first vendor tool operates on a first computer system; and
the second vendor tool operates on a second computer system.

18. The AI system of claim 15, wherein the computer code when executed by the processor:
extracts attributes from a third cyberthreat detected by a third vendor tool; and
delays deployment of countermeasures against the third cyberthreat until an intersection of the attributes extracted from the third cyberthreat and the union set exceeds a threshold number of members.

19. The AI system of claim 15, wherein when the intersection exceeds the threshold number of members, the computer code when executed by the processor allocates computing resources to the deployment of the set of countermeasures until the first and second cyberthreats are neutralized.

20. The AI system of claim 15 when the intersection exceeds the threshold number of members, the computer code when executed by the processor assigns a visual marker to attributes included in the intersection.

* * * * *